US012173236B2

(12) United States Patent
Schuster

(10) Patent No.: US 12,173,236 B2
(45) Date of Patent: Dec. 24, 2024

(54) APPARATUS FOR THE PRODUCTION OF BIOCHAR BY THE PYROLYSIS OF BIOMASS

(71) Applicant: RÜGER ABEL PATENTANWÄLTE PARTGMBB, Esslingen (DE)

(72) Inventor: Reimund Schuster, Dischingen (DE)

(73) Assignee: RUGER ABEL PATENTANWALTE PARTGMBB, Esslingen (DE)

( * ) Notice: Subject to any disclaimer, the term of this patent is extended or adjusted under 35 U.S.C. 154(b) by 0 days.

(21) Appl. No.: 18/008,403

(22) PCT Filed: May 26, 2021

(86) PCT No.: PCT/EP2021/064065
§ 371 (c)(1),
(2) Date: Dec. 5, 2022

(87) PCT Pub. No.: WO2021/244920
PCT Pub. Date: Dec. 9, 2021

(65) Prior Publication Data
US 2023/0279296 A1   Sep. 7, 2023

(30) Foreign Application Priority Data

Jun. 4, 2020 (EP) .................... 20178360

(51) Int. Cl.
*C10B 47/20* (2006.01)
*C10B 53/02* (2006.01)

(52) U.S. Cl.
CPC .............. *C10B 47/20* (2013.01); *C10B 53/02* (2013.01)

(58) Field of Classification Search
CPC ...... C10B 1/04; C10B 47/00–48; C10B 53/06
See application file for complete search history.

(56) References Cited

U.S. PATENT DOCUMENTS 1,384,939 A  *  7/1921  Darling ................... C10B 53/06
                                                          48/209
3,377,266 A  *  4/1968  Salnikov ................. C10B 53/06
                                                          201/34
(Continued)

FOREIGN PATENT DOCUMENTS

CN    108822880 A   11/2018
CN    109575967 A    4/2019
(Continued)

OTHER PUBLICATIONS

PE2E English tranlsation of WO 2017/207104.*
(Continued)

*Primary Examiner* — Jonathan Luke Pilcher
(74) *Attorney, Agent, or Firm* — CANTOR COLBURN LLP

(57) ABSTRACT

An apparatus for the continuous production of biochar by pyrolysis of biomass under exclusion of oxygen is provided. The apparatus includes a vertically mounted reactor having a reactor interior which is defined by a reactor shell and which has an upper feed region, a lower removal region and a process space located therebetween, a feed device for feeding biomass to the upper feed region, a removal device for removing biochar from the lower removal region, and a heating device positioned in the reactor interior. The heating device includes a plurality of outer heating rods vertically arranged in the vicinity of the reactor shell and distributed around the circumference of the reactor, and at least one inner heating rod vertically arranged in or in the vicinity of the center of the reactor interior. A control device is provided for controlling the operation of the apparatus. The control device controls the actuation of the feed device and the removal device and regulates the temperature of the heating rods in dependence on temperatures measured at distributed locations in the reactor interior in order to adjust the holding (Continued)

time and pyrolytic conversion of the biomass in dependence on the respective operating conditions, ambient conditions and the particular biomass used.

19 Claims, 6 Drawing Sheets

(56) References Cited

U.S. PATENT DOCUMENTS

| | | | | | |
|---|---|---|---|---|---|
| 3,432,397 | A | * | 3/1969 | Berg | C10B 47/18 |
| | | | | | 208/402 |
| 4,412,889 | A | * | 11/1983 | Oeck | C10B 7/10 |
| | | | | | 202/241 |
| 4,740,270 | A | * | 4/1988 | Roy | C10G 1/10 |
| | | | | | 201/35 |
| 11,008,519 | B2 | * | 5/2021 | Schneider | C10B 51/00 |
| 2016/0265847 | A1 | | 9/2016 | Handerek | |
| 2018/0056262 | A1 | * | 3/2018 | Miller | C10K 1/16 |
| 2021/0054290 | A1 | * | 2/2021 | Schneider | C10B 17/00 |

FOREIGN PATENT DOCUMENTS

| | | |
|---|---|---|
| DE | 102009026895 A1 | 12/2010 |
| EP | 0621331 A1 | 10/1994 |
| WO | 2014198180 A1 | 12/2014 |
| WO | 2017207104 A1 | 12/2017 |

OTHER PUBLICATIONS

International Search Report and Written Opinion; Issued: Aug. 3, 2021; International Application No. PCT/EP2021/064065, Filed: May 26, 2021; 12 pages.

\* cited by examiner

APPARATUS FOR THE PRODUCTION OF BIOCHAR BY THE PYROLYSIS OF BIOMASS

CROSS REFERENCE TO RELATED APPLICATIONS

This application is a National Stage of PCT Application No. PCT/EP2021/064065 filed on May 26, 2021, which claims priority to European Patent Application No. EP20178360.2 filed on Jun. 4, 2020, the contents each of which are incorporated herein by reference thereto.

TECHNICAL FIELD

The present invention relates to an apparatus for the production of biochar by pyrolysis of biomass.

BACKGROUND

Biochar is increasingly used in agriculture as a soil conditioner and carrier for fertilizers and microhabitat for microorganisms such as bacteria and fungi, as an auxiliary material for composting and nutrient fixation of slurry, as a feed additive and food supplement. Biochar is also increasingly used in other industries, such as medicine, for building insulation, as an energy source for combined heat and power plants and industrial plants, etc.

Biochar can be produced, among other things, by pyrolysis under exclusion of air at temperatures between about 400° C. and 1000° C. by converting vegetable feedstocks, such as wood, straw, plants growing on land, biomass, residues from biogas plants or the like, into a porous carbon product having a high carbon content by pyrolytic charring. Pyrolysis takes place under exclusion of oxygen (in an anaerobic way) to prevent combustion, splitting off water from the biomass and decomposing the biomass by thermally cracking organic compounds due to the high temperature during pyrolysis. Biochar, pyrolysis gas, also called synthesis gas, and heat and ash are generated. Minerals from the original biomass are bound in the pores and on the surface of the biochar. This benefits the use of the biochar as a soil conditioner.

If the biochar is incorporated into agricultural soils, a high proportion of the substance of the biochar remains stable for a long time of over 1000 years, so that the assimilated carbon dioxide can be removed from the atmosphere for a long term. Thus, biochar can make an important contribution to reducing global warming.

In addition to a high carbon content, a high degree of charring and a good stability of the biochar, a high porosity of the produced biochar pieces is particularly important in order to provide a large specific surface area for the absorption of water, nutrients and the like. The porosity, absorption capacity and pre-carbonization degree of the produced biochar depend on the pyrolysis conditions, such as the process temperature and the holding time of the biomass in the pyrolysis chamber, the type of biomass used, its moisture degree and particle size, and other factors. The pyrolysis process must be carefully selected or adjusted depending on the given factors in order to ensure high quality of the produced biochar.

WO 2017/207104 A1 discloses an apparatus for the continuous production of biochar by pyrolysis of biomass under exclusion of oxygen, comprising at least one vertically arranged reactor which includes an upper cover with a feed device for biomass, a lower removal device for biochar, a discharge device for pyrolysis gas, and an internal heating device. The heating device includes a plurality of heating rods which are arranged vertically within the reactor, distributed around the circumference and positioned in the vicinity of the reactor wall. In one embodiment, eight heating rods are provided at uniform circumferential intervals from each other, the length of the heating rods being approximately half the height of the reactor. The heating rods are attached to the upper cover of the reactor to heat the upper half of the reactor interior.

The known device allows continuous operation in which the resulting biochar is continuously removed from the reactor while biomass is replenished from above, which then migrates downward under gravity along the heating rods, thereby being pyrolyzed to biochar. After passing the heating rods, the resulting biochar is cooled and discharged via the lower removal device.

The multiple heating rods distributed in the circumferential direction enable the setting of a suitable process temperature in the reactor interior. However, despite the multiple heating rods, it can be difficult to ensure optimum process conditions, in particular a respectively suitable temperature distribution throughout the reactor interior, for appropriate treatment of the material. It would be advantageous to have a uniform temperature distribution in the horizontal direction across the reactor interior, as well as a gradual temperature increase in the downward depth direction for a uniform, slow increase in the degree of charring. Such a temperature profile, which is furthermore adapted to the respective process conditions, cannot always be achieved with the heating device of the previously known pyrolysis apparatus.

In addition, there is a risk that in the center of the reactor, in relation to the reactor shell, pieces of material of the biomass or the resulting biochar simply fall through without having been sufficiently treated, so that the resulting biochar can have too low a degree of carbonization there. This is also referred to as funneling. Such funneling can also occur in carbon reactors that use an internal heating device in the form of a heating coil that extends progressively downward in a spiral way around the circumference of the reactor. In any case, funneling should be avoided in a pyrolysis reactor which is vertically mounted with biomass migrating by gravity alone if no internal devices control the flow rate of the biomass.

Furthermore, a pyrolysis apparatus should ensure the best possible exclusion of ambient oxygen. Oxygen ingress can lead to combustion, low-quality coal with a high ash content and high mass loss resulting therefrom.

There is still a need for a pyrolysis apparatus for the production of biochar under exclusion of air, which is adaptable to varying operating and ambient conditions and allows the setting of respectively suitable process conditions in the reactor interior.

BRIEF SUMMARY

Based on the above, it is an object of the invention to avoid the shortcomings of conventional pyrolysis apparatuses and to provide a new apparatus for the continuous production of biochar by pyrolysis of biomass under exclusion of oxygen, which fulfills at least some of the aforementioned objectives. In particular, the apparatus should enable an adaptability of the process temperatures and temperature distributions and the holding time of the biomass in the reactor interior in dependence on varying operating and ambient conditions and the biomass used in a simple way and reduce the risk of funneling with insufficient charring of the biomass. Furthermore, a good exclusion of oxygen should be enabled.

This object is solved by the apparatus having a vertically mounted reactor having a reactor interior which is defined by a reactor shell and which has an upper feed region, a lower removal region and a process space located therebetween; a feed device for feeding biomass to the reactor interior into the upper feed region; a removal device for removing biochar from the reactor interior from the lower removal region; a heating device positioned in the reactor interior, the heating device comprising an array of heating rods including: a plurality of outer heating rods vertically arranged in a vicinity of the reactor shell and distributed around a circumference of the reactor, and at least one inner heating rod vertically arranged closer to a center of the reactor interior with respect to the reactor shell; and a control device for controlling operation of the apparatus, including actuation of the feed device and the removal device, and for controlling a temperature of the heating rods.

The apparatus according to the invention for the continuous production of biochar by pyrolysis of biomass under exclusion of oxygen comprises a vertically mounted reactor having a reactor interior which is defined by a reactor shell and has an upper feed region, a lower removal region and a process space located therebetween. The apparatus further comprises a feed device for feeding biomass to the reactor interior into the upper feed region, a removal device for removing biochar from the reactor interior from the lower removal region, and a heating device positioned in the reactor interior. The heating device comprises an array of heating rods including a plurality of outer heating rods vertically arranged in the vicinity of the reactor shell and distributed around the circumference of the reactor, and at least one inner heating rod vertically arranged closer to the center of the reactor interior with respect to the reactor shell. The apparatus further comprises a control device for controlling the operation of the apparatus, including the actuation of the feed device and the removal device, and for controlling the temperature of the heating rods.

The invention further provides, in addition to a plurality of outer heating rods vertically positioned in the vicinity of the reactor shell, one or more inner central heating rods positioned at or in the vicinity of the middle or the center of the reactor. The inner heating rod or rods and the outer heating rods may be heated in combination with each other in a manner controlled by the control device to provide a desired and, depending on given operating and environmental conditions and the biomass used, required temperature distribution in the reactor interior in order to always allow optimal treatment or charring of the biomass. For example, a uniform temperature can be achieved in the horizontal direction, across the reactor. Different temperature profiles can also be specified. The inner heating rod(s) also counteract(s) an unwanted falling through of the biomass material pieces in the middle of the reactor, so that a funneling can be avoided.

The apparatus according to the invention is configured and suitable for the continuous production of biochar, whereby biomass can be continuously fed in, converted to biochar and removed or discharged without having to interrupt the process. Wood chips, wood waste, agricultural waste, straw, plants, fruits and the like, as well as sewage sludge, microalgae, aquatic plants, etc. can be used as biomass. Due to the increased degree of control or controllability of the temperature and other process conditions, biomass of different types, moisture levels and temperatures can be optimally treated even at varying ambient temperatures. The moving bed of biomass moves downward to the removal device by gravity alone. Any transport devices are not required for this purpose. The sinking biomass acts as a kind of biofilter for the pyrolysis gas being which is generated and flows upwards in countercurrent.

A highly porous biochar having a high specific surface area and a high carbon content of more than 90% by weight, preferably more than 95% by weight, can be produced. Furthermore, the apparatus and the control of the process conditions can achieve a very low level of harmful polycyclic aromatic hydrocarbons (PAHs) in the biochar of less than 4 mg/kg, even less than 2 mg/kg.

In advantageous embodiments, the reactor can be tubular, formed as a hollow circular cylinder and set up vertically. The outer heating rods can then be positioned in a circular, point-symmetrical arrangement with respect to the reactor center in the vicinity of the circular cylindrical shell, which in conjunction with the at least one inner heating rod facilitates achieving a uniform temperature distribution in the radial, horizontal direction. If there are multiple inner heating rods, they are preferably also positioned on a circle with a smaller diameter, closer to the center of the reactor interior.

Each outer and inner heating rod may be heatable by means of electrical energy and individually controllable in its heating power. The control device can be arranged to individually control or regulate the heating power of each one of the heating rods. In particular, the control device may adjust, control or regulate the electrical energy supplied to each individual heating rod as required and as process conditions dictate.

In advantageous embodiments, the heating device comprises at least four, preferably at least six or eight outer heating rods, which may be arranged at a uniform circumferential intervals from each other, and it comprises at least two, preferably at least three or four inner heating rods, which may also preferably be arranged at a uniform circumferential intervals. For example, there may be two circular ring arrangements of heating rods, a central ring and an outer ring, which are arranged concentrically to each other. Depending on the size, in particular width or the diameter, of the apparatus, any number of outer and inner heating rods may be used.

In particularly preferred embodiments, the number of the outer heating rods is at least twice the number of the inner heating rods, and at least some, preferably all, of the inner heating rods can be positioned offset from the outer heating rods in the circumferential direction. Good control of uniform temperature conditioning in the interior is then possible. For example, in advantageous embodiments, twice as many outer as inner heating rods are used, wherein the inner heating rods are offset by half the angular distance of the outer heating rods with respect to the latter, i.e. are positioned in the circumferential direction approximately in the middle between two outer heating rods in each case. This results in a symmetrical arrangement suitable for temperature control of the interior.

In advantageous embodiments, the heating rods may be attached by mounting means to an upper cover of the reactor interior or to one or more side walls in the upper feed region of the reactor interior and may project into the reactor interior in a freely suspended manner. The outer and inner heating rods then extend in a freely suspended manner in the vicinity of and along a reactor inner wall of the reactor shell and in the vicinity of the center of the reactor interior, respectively. Additional suspension or support devices for the heating rods in the reactor interior are not required, so that a flow of the moving bed in the reactor interior is not impeded thereby. Advantageously, the mounting devices can also contain the electrical connections, which are electrically connected on the one hand via external supply lines to an external energy source for supplying energy to the heating rods and on the other hand to the individual heating rods. This arrangement is extremely compact and clearly arranged.

In a further embodiment, the upper end portions of at least the at least one inner heating rod or also of the outer heating rods, which are led out through the upper cover or the mounting devices, for example, can be bent outwards to the side. In embodiments in which the heating rods are led out through at least one side wall of the upper feed region, preferably the upper end portions of both the outer heating rods and the inner heating rod(s) are bent or curved outwardly. By bending the outlets of at least the inner heating rods outwardly, e.g. radially outwardly, away from the center of the reactor, a larger access opening is left free in the center of the reactor, through which the biomass can be fed to the reactor almost unimpeded.

The curvature of the upper end portions of the heating rods and the receiving openings or mounting devices for the heating rods on the upper cover or the side wall or walls of the upper feed region can be set up and coordinated in such a way that the heating rods as a whole can be inserted into and mounted in the reactor interior from the outside through the receiving openings or mounting devices and mounting work from the inside or inside the reactor interior is not required.

In advantageous embodiments, the apparatus comprises a plurality of temperature sensors for measuring temperatures at distributed locations in the reactor interior. Preferably, the temperature sensors are provided distributed at many locations in the reactor interior and are connected to the control device which then controls the operation of the apparatus in dependence on the temperature readings. In particular, the control device can precisely regulate the temperatures in all areas of the reactor interior provided with temperature sensors to a desired value. Preferably, at least one temperature sensor is assigned to each region or sector of the reactor interior defined by an inner heating rod and the next adjacent outer heating rods.

In particularly preferred embodiments, each heating rod is assigned at least one temperature sensor for measuring the temperature in the vicinity of the heating rod. The temperature sensors can be attached to the heating rods, i.e. supported by them. This allows individual temperature control for each single heating rod and easy handling.

Advantageously, a plurality of temperature sensors may additionally be arranged below the heating rods in the vicinity of the removal device in order to measure the temperature of the produced biochar prior to its removal. Such temperature sensors may be formed as an extension of the heating rods or attached to such one. Monitoring the temperature of the final product may serve quality assurance purposes to ensure sufficient holding time at a given temperature. For example, if the measured temperature of the end product is significantly below the target temperature, this may indicate that the biomass has slipped through. In this case, various measures can be taken to virtually eliminate or at least greatly reduce the risk of funneling.

For example, the distribution of the biochar across the reactor interior or the passage of the biochar to the removal region can be influenced by means of an integrated controllable distribution device and/or the removal of the biochar and refilling of biomass can be delayed in order to force a longer holding time to increase the degree of carbonization.

In a particularly advantageous further embodiment, each heating rod can have two or more, preferably three, elongated heating rod elements which are arranged in series, one behind the other in the longitudinal direction or height direction of the reactor and which can be individually controlled in terms of heating power. Each inner and outer heating rod can thus form a heating rod arrangement of two or three or more heating rods arranged one above the other. This allows a desired temperature profile to be specified and precisely controlled, even in the longitudinal or height direction of the reactor. Each heating rod element is preferably assigned a dedicated temperature sensor.

The control device can be configured so as to regulate the heating power of the superimposed heating rod elements during operation in such a manner that an increasingly higher temperature of the reactor interior is set in the downward depth direction and a lower cooling temperature is set in the vicinity of the removal device. In this way, at least two, preferably three or even more heating zones or regions of increasing heating power or temperature in the depth direction can be created in the reactor interior in order to pyrolyze the biomaterial slowly, increasingly more strongly during the holding time in the reactor interior and on its downward migration path.

A first, uppermost region can be set or controlled, for example, to a temperature of about 100-200° C., in particular about 150° C., in order to dry or dehumidify the supplied biomass. A further, second range below this can be set to about 200-600° C., in particular 300-500° C., in order to enable degassing in the middle range of the reactor. A further, third region below this can be set or controlled to about 500-900° C., in particular 700-800° C., in order to effect increasing pyrolytic conversion (charring, carbonization) of the biomass to biochar in this region. A final, underlying cooling region can be set to about 100-200° C., in particular about 150° C., in order to allow cooling of the finished biochar to a temperature suitable for removal.

The creation of different process or heating zones in the height direction of the reactor also causes the resulting pyrolysis gas, which is very explosive or flammable, to be increasingly cooled as it passes through the different heating zones so that it is no longer explosive when it reaches the gas dome in the upper feed region, from which the pyrolysis gas is then discharged.

Advantageously, the refilled cooler biomass acts as a kind of biofilter to filter the resulting pyrolysis gas and ash, etc., which rise to the top. The ash is thereby filtered out and prevented from escaping into the atmosphere by a removal device for pyrolysis gas together with the latter.

In order to facilitate maintaining the set temperatures in the reactor interior and to reduce the need for electrical energy, the reactor shell can be provided with thermal insulation in the area of the heating zones.

If, for example, the heating device has three inner and eight outer heating elements, i.e. a total of 11 heating rod arrangements, each with three individually controllable or electrically heatable heating rod elements arranged one above the other, then a total of 11×3=33 regions, which can be suitably tempered individually, can be defined by the heating rod elements or between them. This makes it possible to heat individual heating rod elements more strongly if too low a temperature is measured in their vicinity, which can be attributed to slipping of the biomass, for example.

In an embodiment that enables particularly effective exclusion of air, the feed device can have a feed lock, and the lower removal device can have a discharge lock. The control device may be arranged to actuate the feed lock and the discharge lock such that they are opened in time offset from each other, alternately, and never both locks are open at the same time. The air intake through the locks can be reduced to a minimum. The use of the locks can significantly increase the tightness of the apparatus compared to simple closure lids, flaps or other closure elements.

In one implementation, the feed lock and the discharge lock may form lockable containers with a defined volume for feeding and removing a defined amount of biomass and biochar, respectively, and may each comprise a first and a second adjustable slider which are spaced from each other in the height direction and define a lockable lock space between them. The sliders may be pivotable or slidable or otherwise movable to open or close a passage. The adjustment can preferably be pneumatically or electrically actuated. Sliding plates, flaps, valves or other means may be used, which can be opened and closed. In any case, the control device is arranged to actuate the first and the second adjustable sliders in such a way that they are opened in time offset from each other, alternately, never simultaneously. By such a controlled and coordinated actuation of the sliders of each of the feed lock and the discharge lock, a substantially absolute tightness can be achieved, so that no or hardly any ambient oxygen enters the reactor interior.

If desired, an inert gas, such as carbon dioxide or nitrogen, can be blown into the lock space via a supply line to further inhibit air entry and reduce the risk of combustion in the reactor interior.

Otherwise, the reactor interior can be free of moving parts. In particular, the reactor interior preferably does not contain any moving parts, such as agitators, screw conveyors, layer sliders, etc., which serve to transport the treated biomass downward during the pyrolysis process. The transport is caused by gravity alone, as the moving bed of treated biomass flows progressively downward by gravity, wherein the flow rate can be controlled by operating the locks.

The control device can advantageously have a control logic which is configured to control the holding time of the treated biomass in the reactor interior as a function of the regulated heating temperature of the heating rods depending on the temperatures measured in a distributed way in the reactor interior while adapting the actuation of the feed device and the removal device. Just by a suitable regulation of the heating rod temperatures and a correspondingly adapted actuation of the locks, the control device can carry out a pyrolysis with homogeneous biochar end products even with varying biomass materials, degrees of moisture and temperatures of the biomass, at different ambient temperatures, etc., preferably in a completely automated way. It can be ensured that the biomass material is treated for a sufficiently long time at the desired temperature in each temperature zone without being overheated, which all together forms the basis for a high-quality biochar with a desired particle size, high degree of charring, high carbon content, low ash content, low PAH content, high porosity and large specific surface area. To control the required or desired holding time of the treated biomass in the reactor interior, other measured parameters, such as the measured negative pressure in the upper feed region generated by the suction of the resulting pyrolysis gas or the temperature during the combustion of the pyrolysis gas, can also be used.

In particular, the apparatus can contain a discharge device for pyrolysis gas, which can be arranged in a gas dome in the upper feed region and can be connected, for example, to a suction fan or the like in order to generate a negative pressure in the gas dome. Any air entering the gas dome can then be effectively discharged together with the pyrolysis gas. This additional measure can further reduce the risk of air entering the reactor interior with the associated disadvantages, such as combustion, loss of mass, low-grade coal with high ash content, etc.

In an advantageous further embodiment, any of the above-mentioned apparatuses can have a controllable distribution device in the removal region or in the vicinity thereof for distributing the biochar in the transverse direction, i.e. over the width of the reactor interior, wherein the distribution device can have two or more individually controllable and motor-driven movable distribution means for this purpose. In particular, the distribution means can be formed by a plurality of, e.g. four, distribution augers arranged parallel to each other, which can be individually controlled and preferably driven by a motor in both directions of rotation in order to displace the biochar towards a side wall or towards the center of the removal region, as required. In addition, the mass flow rate of biochar towards the removal region can be controlled. In any case, incipient funneling can be effectively counteracted. Apart from the distribution device, the reactor does not have any moving parts, such as agitators, screw conveyors, layer sliders, etc., which serve to transport the treated biomass downward during the pyrolysis process.

BRIEF DESCRIPTION OF THE DRAWINGS

Further advantageous details of embodiments of the invention are apparent from dependent claims, the drawing and the accompanying description. In the drawing, no limiting examples of embodiments of the subject matter of the invention are shown. As far as possible, the same reference signs are used in all FIGS. to designate the same parts or components, in which case, unless otherwise specified, the explanations apply accordingly to all FIGS. In the drawing:

DETAILED DESCRIPTION

Figure 1:
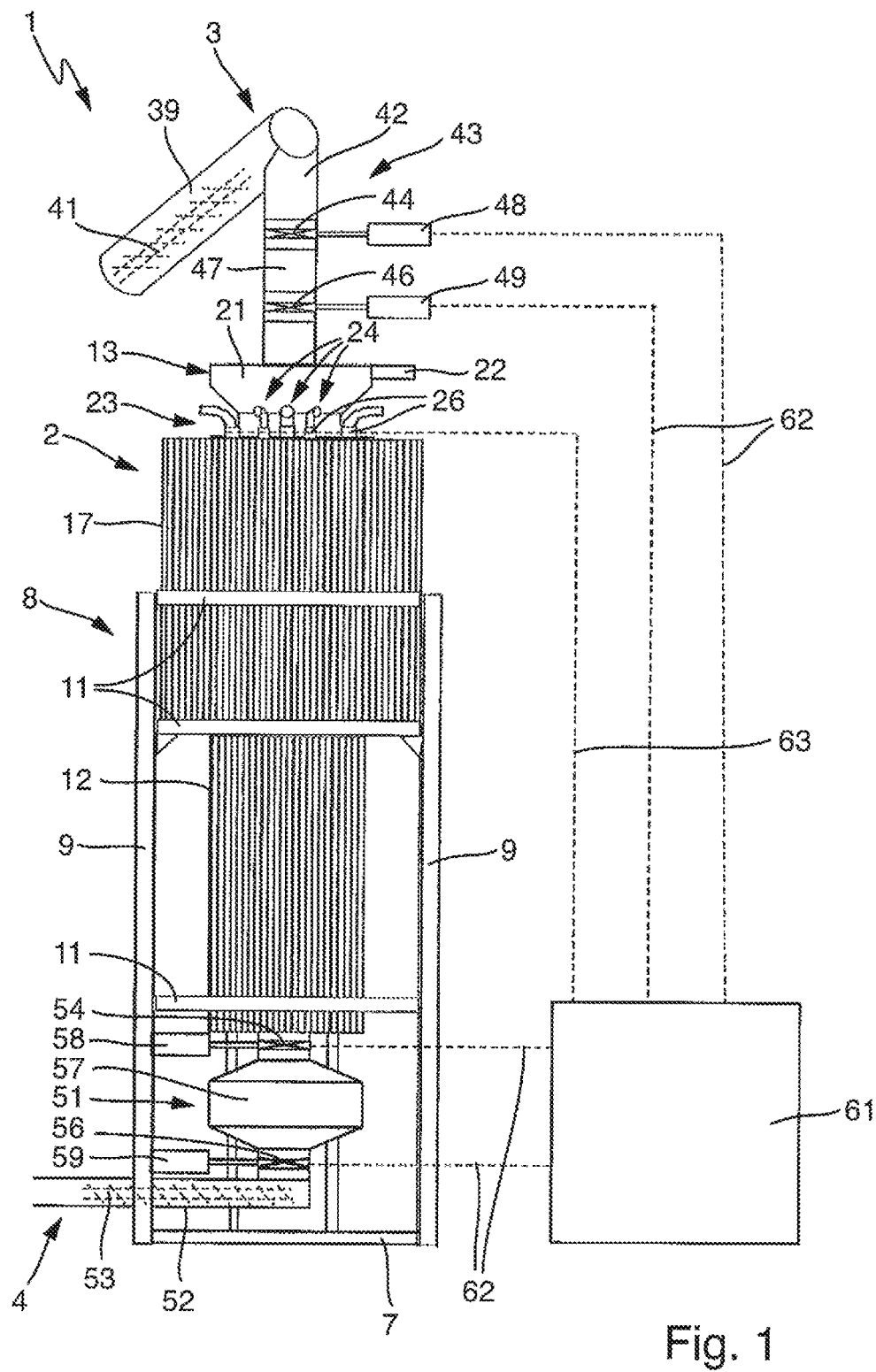
FIG. 1 is a schematic view of an apparatus for the production of biochar by pyrolysis according to an embodiment of the invention.

FIG. 1 shows an apparatus 1 according to the invention for the production of biochar by pyrolysis of biomass under exclusion of oxygen according to an exemplary embodiment of the invention in a highly schematized overall view. Here, the apparatus 1 comprises a reactor 2 in which a pyrolytic conversion of biomass into biochar takes place during operation, a feed device 3 for feeding biomass to the reactor 2, and a removal device 4 for removing the produced biochar from the reactor 2. The reactor 2 is a tubular reactor which is mounted vertically. A support structure 8, which has vertical beams 9, horizontal support struts 11 and cross struts, which are not shown in more detail here, holds the reactor 2 in a freely suspended manner in the vertical position. The vertical beams 9 of the support structure 8 extend to the floor plate 7 and are supported against the floor, which is not shown in more detail here, at the installation site of the apparatus 1. The reactor 2 might additionally be supported against the floor by means of floor beams, but the freely suspended arrangement is preferred due to thermal expansions and contractions and vibrations of the reactor occurring during operation.

Figure 2:
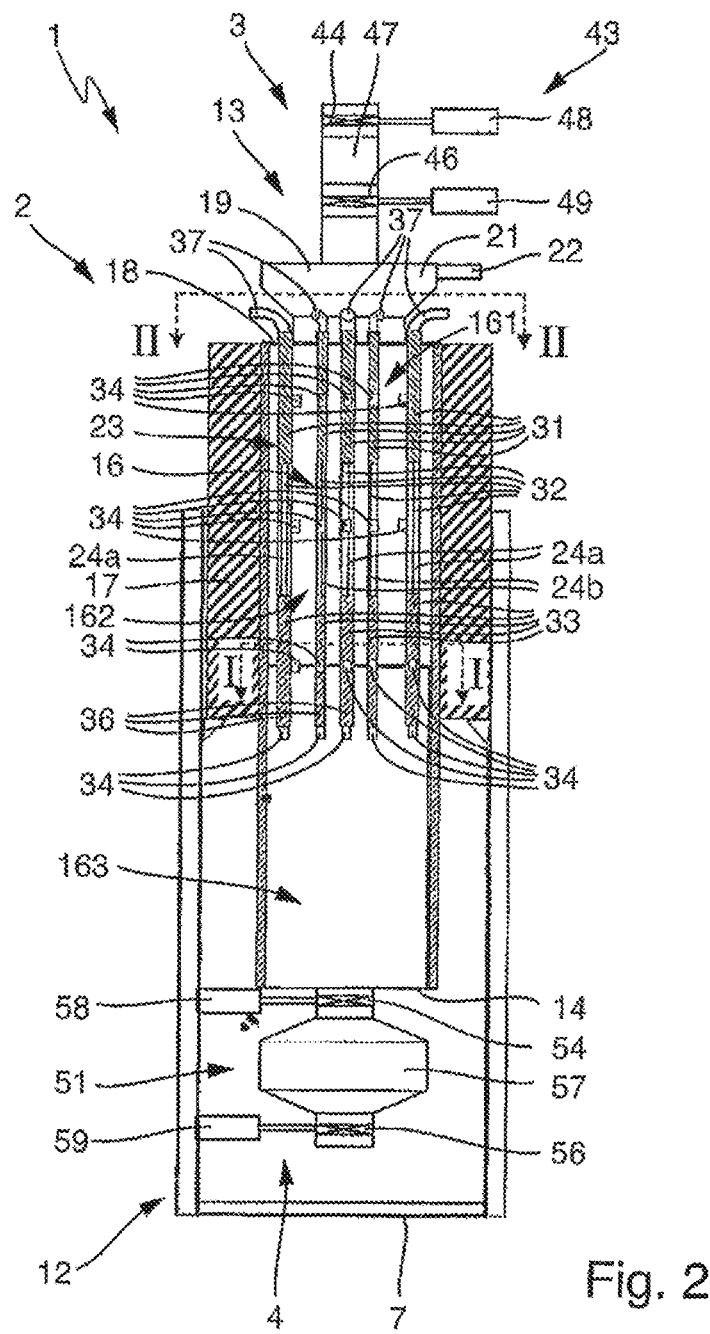
FIG. 2 is a simplified side view of the apparatus according to FIG. 1, partially shown in longitudinal section.
Figure 3:
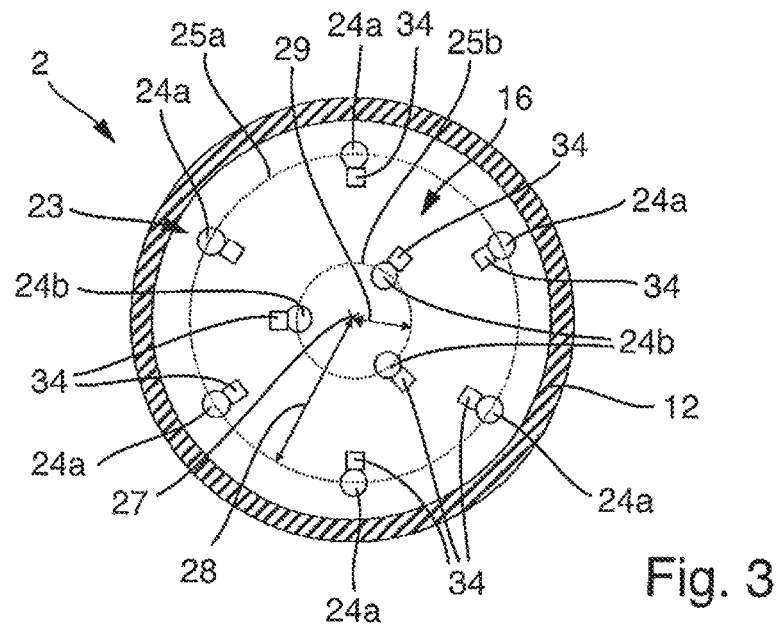
FIG. 3 is a simplified cross-sectional view of the apparatus according to FIG. 1, taken along line I-I in FIG. 2.
Figure 4:
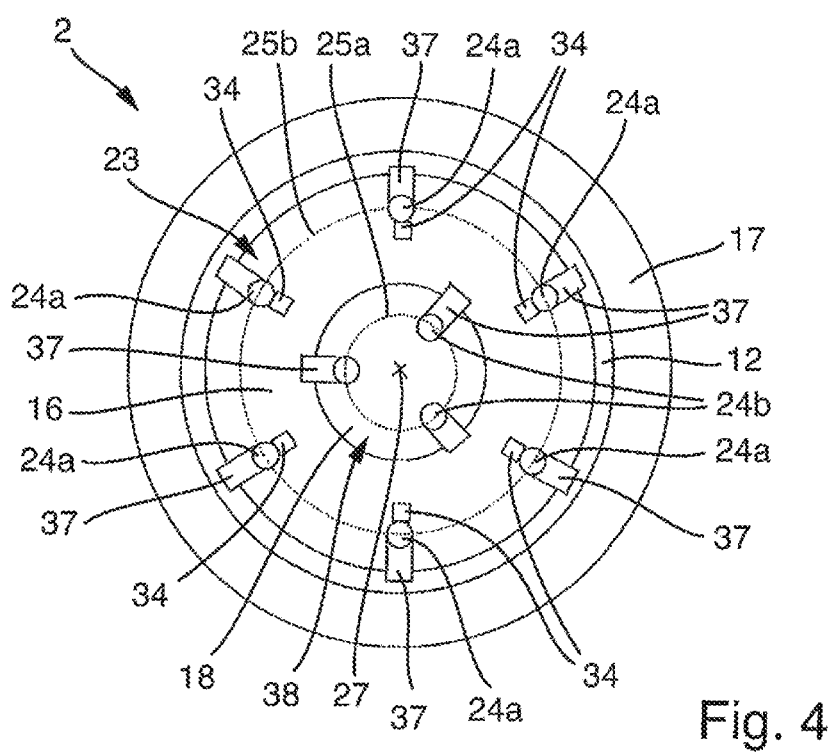
FIG. 4 is a simplified cross-sectional view of the apparatus according to FIG. 1, taken along line II-II in FIG. 2.

The reactor 2, as shown in side view in FIG. 1, is shown in more detail in FIGS. 2-4 in longitudinal section and in various cross-sectional views. In the preferred embodiment shown here, the reactor 2 has a tubular shell 12 which has the shape of a circular hollow cylinder, an upper cover 13 which is arranged at the upper end of the reactor 2, and a lower bottom 14. The upper cover 13, the shell 12 and the lower bottom 14 together define a reactor interior 16, hereinafter also referred to simply as interior 16, in which the pyrolytic conversion of the biomass takes place. The reactor interior 16 extends in the height direction from an upper feed region 161 for feeding biomass, through a process space 162 for pyrolysis treatment of the biomass, to a lower removal region 163 for removal of the finished biochar.

A substantially tubular insulation 17, which thermally insulates the reactor 2 from the environment, surrounds the shell 12 of the reactor 2 in an upper portion thereof. Here, the thermal insulation 17 has a height substantially equal to half the height of the reactor 2 and extends downwardly from the plane of the upper cover 13 across the upper half of the reactor 2. The thermal insulation 17 may have any height. In any case, it preferably covers the area of the interior of the reactor 16 in which the high temperatures required for pyrolysis up to or above 900° C. prevail, in order to prevent or at least greatly reduce the passage of heat to the outside. The thermal insulation 17 can be made of any suitable materials with the lowest possible thermal conductivity and can include, for example, foams, ceramic fiber insulations and the like.

The upper cover 13 may include a cover plate 18 and a cover flap 19 which may be folded down, if necessary, to provide access to the reactor interior 16 for maintenance or the like. The cover flap 19 defines a gas dome 21 in the upper feed region 161 to which gases generated during pyrolysis rise and in which they accumulate. A discharge device 22 for pyrolysis gas, which is indicated here only by a short line connection, is connected to the gas dome 21 and is set up to discharge the pyrolysis gases located in the gas dome 21 from the reactor interior 16 to the outside. Preferably, the discharge device 22 is arranged to generate a negative pressure in the gas dome 21, which facilitates the rejection of gases. For example, the discharge device 22 can be connected to a suction fan or the like (not shown).

As can be seen in particular from FIGS. 1 and 2, the reactor 2 has a heating device 23 which is attached to the upper cover 13 and is located in the reactor interior 16 to heat it. The heating device 23 comprises a plurality of heating rods 24 which are heated by means of electrical energy. The heating rods 24 are attached to the upper cover 13 by mounting means 26 and project through receiving openings, which are not shown here, and vertically and in a freely suspended manner into the reactor interior 16, extending in the reactor interior 16 substantially parallel to each other and to a side inner wall of the reactor shell 12, which is not further designated herein. The mounting means 26 also serve as connections for supply lines connecting the heating rods 24 to an external source of electrical energy (not illustrated) to supply electrical energy to the heating rods 24 for heating.

As can be seen in particular from FIGS. 2, 3, and 4, the heating rods 24 are arranged in a distributed way over the cross-section of the reactor interior 16 to allow the temperature to be as uniform as possible thereover. In particular, the heating device 23 comprises herein a plurality of outer heating rods 24a arranged in the vicinity of the reactor shell 12 in a distributed manner around the circumference of the reactor 2 and extending vertically in the longitudinal direction or height direction of the reactor 2. The heating device 23 further comprises at least one, in this case a plurality of inner or central heating rods 24b arranged in or in the vicinity of the middle or the center of the reactor 2, in any case closer to the middle or the center than the outer heating rods 24a, and also extending vertically along the reactor 2. The middle or center of the reactor 2 relative to the reactor shell 12 is indicated by 27 in FIGS. 3 and 4.

In the example shown, the heating device 23 has six outer heating rods 24a and three inner heating rods 24b, which are each distributed at uniform circumferential intervals from each other along imaginary circular lines around the center 27 of the reactor 2. Thus, two circular ring arrangements of heating rods 24a, 24b are formed, an outer ring 25a having a first, larger radius 28 with respect to the center 27 and an inner or central ring 25b having a second, smaller radius 29 with respect to the center 27. The ring arrangements need not be circular, but may also be, for example, square, rectangular, polygonal or irregular in shape and preferably matching the shape of the reactor 2. The heating device 23 may have any number of outer and inner heating rods 24a, 24b depending on the size of the reactor 2 and the desired operating conditions. In any case, a plurality of, at least four, preferably at least six, more preferably eight or more outer heating rods 24a and at least one inner heating rod 24b are provided. It is preferred to provide at least two or three inner heating rods 24b. In advantageous embodiments, such as these shown in FIG. 2-4, twice the number of outer heating rods 24a may be provided compared to the inner heating rods 24b. The inner heating rods 24b may also be circumferentially offset with respect to the outer heating rods 24a, in which case they may be herein circumferentially offset by half the angular distance of the outer rods 24a, for example. This can result in an extremely convenient symmetrical arrangement of heating rods 24, which allows good control over the temperature conditions in the interior 16 of the reactor 2. However, the number of the outer heating rods 24a need not be an integral multiple of the number of the inner heating rods, nor need all inner heating rods 24b be circumferentially offset from all outer heating rods 24a. If only a single inner heating rod 24b is used, this would advantageously be located as far as possible in the center 27 of the reactor 2.

Referring again to FIG. 2, it illustrates that each outer heating rod 24a and each inner heating rod 24b in the preferred embodiment shown has three heating rod elements 31, 32, 33 arranged in series or one behind the other in the longitudinal or height direction of the reactor 2. A first heating rod element 31 of each heating rod 24 is attached to the upper cover 13 and projects into the reactor interior 16. A second heating rod element 32 of each heating rod 24 extends adjacent to, below and substantially in alignment with the first heating rod element 31. A third heating rod element 33 extends adjacent to, below and substantially in alignment with the second heating rod element 32. The heating rod elements 31, 32, 22 may be attached to each other so as to provide a continuous heating rod element arrangement 31-33 for each heating rod 24, which is manageable as a whole. However, the heating rod elements 31, 32, 33 can be supplied with electrical energy individually via power lines, which are not shown in detail herein, so that they can be individually controlled or regulated in their heating power.

While each heating rod 24 in the figures has three heating rod elements 31-33, each having substantially the same length, this design is not mandatory. Each heating rod 24 could also have only a single heating rod element or two heating rod elements. The lengths of the heating rod elements 31, 32 and 33 could also be different depending on the desired temperature profile. The total length of the formed heating rods 24 may be at least one-third, preferably about or at least one-half, of the height of the reactor 2 and about the length of the portion of the reactor interior 16, which is thermally insulated by the insulation 17, depending on the application and requirements. The illustrated design with three heating rod elements 31-33 of equal length is particularly advantageous because it provides a high degree of flexibility with respect to the temperature distribution in the reactor interior 16 and good control over it over the length of the reactor 2 from the feed region 161 to the removal region 163, at a reasonable cost and with a simple construction.

As is further illustrated in FIGS. 2-4, the apparatus 1 comprises a multiplicity of temperature sensors 34 distributed at numerous locations in the reactor interior 16 for measuring the temperature at those locations. In the present case, a plurality of temperature sensors 34 is assigned to each heating rod 24. In particular, at least one temperature sensor 34 is advantageously, but not necessarily, assigned to each heating rod element 31, 32, 33 of each heating rod 24. The temperature sensors 34 may be attached to the heating rod elements 31-33. In embodiments, the temperature sensors 34 can be positioned approximately in the middle of each heating rod element 31-33. In addition, temperature sensors 34 are preferably also arranged as extensions at the free lower ends of the heating rods 24, in particular of the lowest, third heating rod elements 33, in order to be able to measure the temperature of the produced biochar prior to its removal.

Fewer or more than the illustrated number of temperature sensors 34 could also be provided to perform the function of adequately sensing the temperatures in the reactor interior 16 at different distributed locations in the transverse direction and in the longitudinal direction of the reactor 2. The temperature sensors 34 need not be connected to the heating rod elements 31-33. They could also be arranged and fixed separately from the heating rods 24. However, the exemplary embodiment shown, in which the temperature sensors 34 are attached to the heating rod elements 31-33, enables easier handling and avoids obstacles to the flow of biomass in the interior 16.

Referring in particular to FIGS. 2 and 4, it can be seen that, according to one aspect, the upper ends 37 of the heating rods 24, here in particular of the first heating rod elements 31, are curved to the side or bent outwards. As a result, an access opening 38 defined in the cover plate 18, through which biomass is fed from the feed device 3 to the reactor interior 16, is less obstructed by the heating rods 24, and the feeding of the biomass is facilitated. In the illustrated embodiment, all of the heating rods 24 or all of the first heating rod elements 31 have bent-over end portions 37 that extend through the mounting means 26. Uniform first heating rod elements 31 or heating rods 24 may be used. In one modification, only the inner heating rods 24b could have bent-over outer ends 37 to expose the access opening 38. Moreover, the bent-over end portions 37 of the heating rods 24 are shown greatly enlarged in the figures for illustrative purposes. In general, they will hardly project outwardly beyond the mounting means 26.

The feed device 3 for feeding biomass to the reactor 2 into the feed region 161 is provided on the upper cover 13. In the exemplary embodiment shown, the feed device 3 can have, for example, a pipeline 39 with an internal filling screw 41 indicated in FIG. 1, which is arranged to transport the biomass from a storage container, which is not shown herein in more detail, to the reactor 2. The pipeline 39 opens via a vertical pipe section 42 into the access opening 38 provided in the upper cover 13. In FIG. 2, the pipes 39, 42 are omitted for simplicity and clarity.

A feed lock 43 is arranged in the pipe section 42, which is set up to feed a metered amount of biomass supplied via the pipeline 39 and the pipe section 42 to the interior 16 under exclusion of air. Here, the feed lock 43 is preferably pneumatically operable but could also operate in an electrically or hydraulically controlled manner.

In the embodiment shown, the feed lock includes a first, upper adjustable slider 44 and a second, lower adjustable slider 46 that are spaced apart from each other in a height direction and define a lockable lock space 47 therebetween. The sliders 44, 46 can be actuated or adjusted independently of each other to allow them to open alternately, offset in time from each other, to prevent or at least minimize air entry through the feed lock 43 into the reactor interior 16.

Different embodiments of the sliders 44, 46 are possible. For example, the sliders 44, 46 could be slider plates that are pivotally or slidably arranged to open or close a passageway. Flaps, valves or other means that can be shifted, i.e. opened and closed, to open and close the passageway, may also be used. To actuate the sliders 44, 46, drive devices 48, 49 are individually associated therewith and are adapted to actuate or adjust the sliders. Here, the drive devices 48, 49 are preferably controllable pneumatic cylinders but could also be formed, for example, by hydraulic cylinders or electric motors.

The apparatus 1 further comprises the removal device 4 for removing the biochar produced by conversion of the biomass from the removal region 163 of the reactor 2. The removal device 4 is arranged below the reactor 2 and is attached to the lower bottom 14 of the reactor 2. The removal device 4 is also designed to be closable against the entry of air and, for this purpose, it includes a discharge lock 51 to which a pipeline 52 is connected for the removal of the produced biochar. The pipeline 52 can include a discharge screw 53 for transporting the biochar discharged via the discharge lock 51 to a suitable collecting container, which is not shown in more detail herein. The discharge screw 53 is only schematically indicated in FIG. 1. In FIG. 2, the pipeline 52 with the discharge screw 53 is omitted for simplicity and clarity.

The discharge lock 51 can be substantially identical to the feed lock 43 and can be arranged to reduce the air intake through the discharge lock 51 to a minimum. For this purpose, the discharge lock 51 may comprise a first, upper slider 54 and a second, lower slider 56 which, similar to the sliders 44, 46, are preferably slidably or pivotally mounted to open or close a passageway. Flaps, valves or other means that can be moved to open and close may also be used. The sliders 54, 56 are each individually associated with a first and a second drive device 58, 59, respectively, which may preferably be formed by controllable pneumatic cylinders or also, for example, by hydraulic cylinders or electric motors. In any case, the sliders 54, 56 can be alternately actuated and adjusted in a controlled manner by means of the drive device 58, 59, so that they open alternately, offset in time from each other. Only a maximum of one of the sliders 54, 56 is open, while the other is closed. In this way, air access to the reactor interior 16 via the removal device 4 can be prevented or at least reduced to a minimum. The explanations given above with respect to the feed lock 43 apply accordingly with respect to the discharge lock 51.

Referring again to FIG. 1, a control device 61 is provided, which is configured to control the operation of the apparatus 1. In particular, the control device 61 is arranged to control the actuation of the feed device 3 and the removal device 4, including the inlet and discharge locks 43, 51, and to control the temperature of the heating rods 24. For this purpose, the control device 61 is connected via control lines 62 to the drive devices 48, 49, 58, 59 of the locks 43, 51 in order to coordinate the opening and closing of the sliders 44, 46 and 54, 56, respectively. Moreover, the control device 61 is connected via control lines, which are not shown in more detail herein, to the electrical power supply for the heating rods 24, which is not shown in more detail herein, in order to control the supply of electrical energy to the individual heating rods 24 or heating rod elements 31-33 of each heating rod 24 to achieve a desired temperature conditioning of the reactor interior 16.

Advantageously, the control device 61 can be configured to control the electrical energy supplied to the heating rods 24 and thus to control the heating of the heating rods 24 in a closed circuit based on the temperatures measured by the temperature sensors 34. For this purpose, the control device 61 is connected to the temperature sensors 34 via lines 63, which are merely indicated in FIG. 1 and via which the temperature sensors 34 can transmit measured values of the measured temperatures to the control device 61. The temperature sensors 34 can transmit the measured values to the control device 61 by themselves at predetermined time intervals. Alternatively, the control device 61 may request transmission of measured values from the respective temperature sensors 34 via the lines 63, whereupon the temperature sensors 34 may then transmit the data to the control device 61. The lines 63 could include a common data bus that enables a communication between the temperature sensors 34 and the control device 61. The temperature sensors 34 could also be connected to the control device 61 via a wireless communication link. Likewise, it is conceivable to replace the control lines 62 with wireless communication links.

Figure 5:
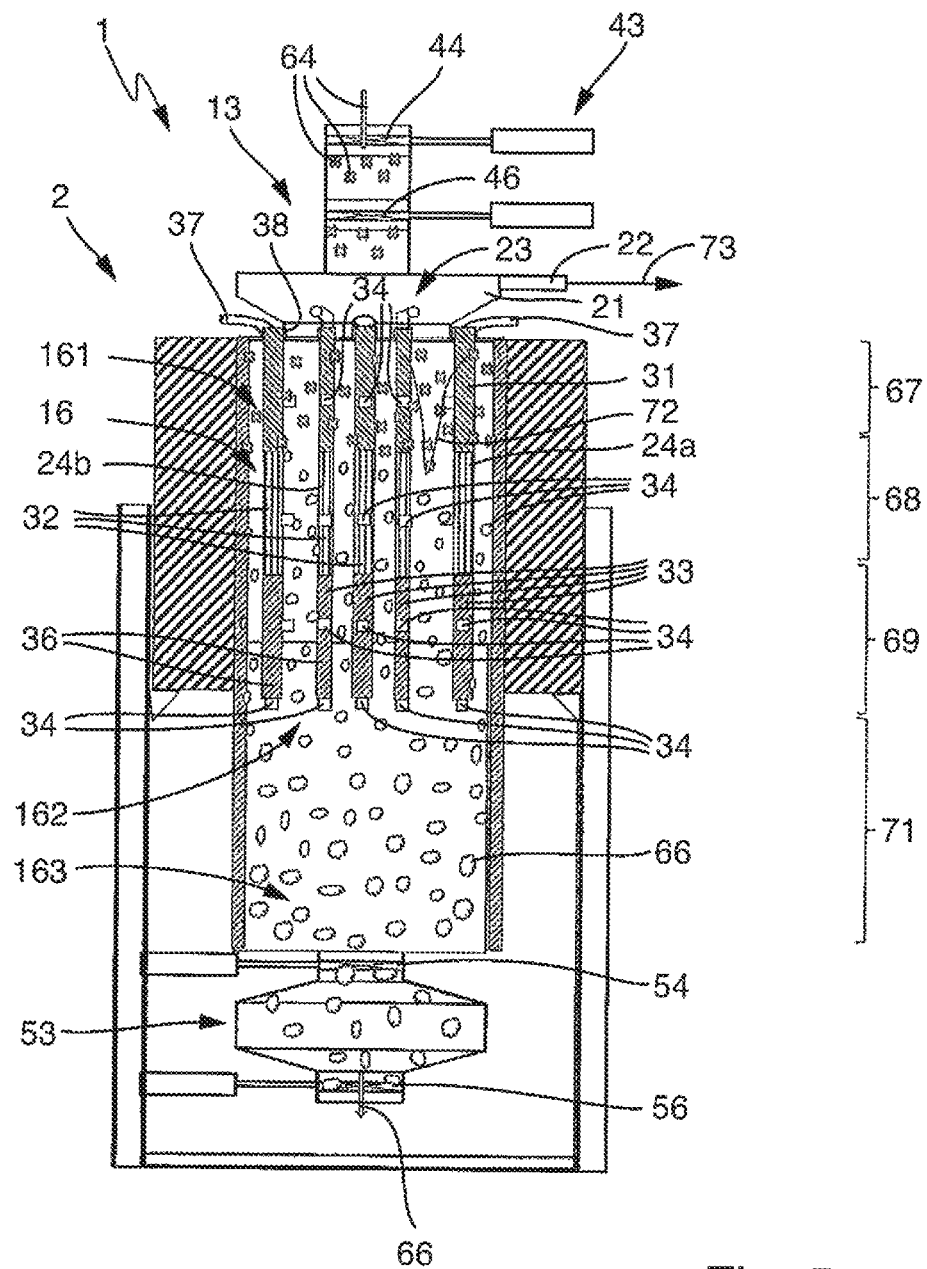
FIG. 5 is a longitudinal sectional view through the apparatus according to FIG. 1, similar to FIG. 2, but in a broadened schematic representation, to illustrate and explain its operation.

The apparatus 1 described so far can be used for the continuous production of biochar by pyrolysis of biomass under exclusion of oxygen. The operation of the apparatus 1 will now be explained with additional reference to FIG. 5 which shows a simplified longitudinal section through the apparatus 1, similar to FIG. 2, illustrating the material flow in operation. The apparatus 1 operates as follows:

In operation, biomass 64 is continuously fed to the apparatus 1 via the feed device 3. Any vegetable feedstock, in particular wood, straw and plants growing on land, can be used as biomass. Residues from biogas plants, sunflower, olive and rapeseed oil production and other waste from vegetables or fruits can also be used. It is also possible to use sewage sludge, microalgae, aquatic plants even with a high moisture content, because by controlling the temperature in different areas of the reactor 2, the apparatus 1 according to the invention is always able to suitably process different types of biomass 64 having different temperatures and different degrees of moisture.

The biomass 64 is fed to the reactor 2 via the feed lock 43. The control device 61 controls the drive devices 48, 49 of the feed lock 43 in such a way that only a maximum of one slider of the sliders 44, 46 is open. For example, the first, upper slider 44 is opened in a controlled manner to fill the lock space 47, while the second, lower slider 46 is closed. Once the lock space 47 is completely filled, the upper slider 44 is closed, while the lower slider 46 is opened to feed the defined amount of biomass 64 from the lock space 47 through the access opening 38 in the upper cover 13 to the feed region 161 of the reactor interior 16. Once the biomass 64 has left the lock space 47 and entered the reactor interior 16, the lower slider 46 is closed to completely seal the feed device 3 in an airtight manner. No pass-through connection from the outside to the reactor interior 16 is permitted during the entire feeding process. The entry of atmospheric oxygen is thus prevented or at least minimized. Should air enter the lock space 47 and subsequently the gas dome 21 immediately below the cover plate 18, it is exhausted to the outside via the discharge device 22 together with the pyrolysis gas produced during the conversion of the biomass in the reactor 2. In this way, atmospheric oxygen cannot or can hardly enter the process space inside the reactor interior 16.

It is also possible to blow an inert gas, such as carbon dioxide or nitrogen, into the lock space 47 to further reduce the risk of atmospheric oxygen entering the reactor interior 16 and combustion.

Once the biomass 64 has entered the reactor interior 16, it is increasingly pyrolytically carbonized therein in a continuous process and converted to biochar. The produced biochar 66 is then discharged via the discharge lock 51 and the discharge screw 53 in the pipeline 52. Advantageously, the sliders 54, 56 are opened and closed in the same manner as the sliders 44, 46 of the feed lock 43 alternately, offset in time from each other, as controlled by the control device 61, so that at no time are both sliders 44, 46 open and an open passage through the removal device 4 is permitted which would allow air to enter the reactor interior 16.

An inert gas, such as carbon dioxide or nitrogen, may also be injected into the lock space 57 of the discharge lock 51, if necessary, to further reduce the risk of air entering the reactor interior 16 and burning the biochar 66 therein.

The amount of produced biochar 66 discharged per actuation cycle is defined and predetermined by the volume of the lock space 57 of the discharge lock 51. The volumes of the lock spaces 47, 57 of both locks 43, 51 can be substantially the same. The discharge lock 51, like the feed lock 43, is opened and closed in specific operating cycles or time intervals, in a manner controlled by the control device 61, depending on the particular operating and environmental conditions, the particular biomass used, and the temperatures measured by the temperature sensors 34.

The biomass 64 or the increasingly converted biochar 66 migrates downwards all the way from the feed lock 43, through the reactor interior 16 to the discharge lock 51 and out of it, solely due to its gravity. No transport devices or moving parts are required to transport the biomass 64 during the pyrolysis process. The velocity of the migrating biomass 64 within the reactor 2 is controlled by the control device 61 through the controlled operation of the feed and discharge locks 43, 51.

Within the reactor interior 16, the moving bed of biomass 64 passes through different zones or regions having different temperatures as dictated by the control device 61 to suitably treat the biomass 64. The control device 61 controls the heating power of the heating rods 24, in particular the heating rod elements 31, 32, 33, in such a manner that an increasingly higher temperature of the reactor interior 16 is set first in the downward depth direction and a lower cooling temperature is set in the vicinity of the removal region 166. Since pyrolysis is an exothermic reaction, the heat released during the pyrolytic conversion of the biomass 64 also affects the temperature in the different areas of the reactor interior 16. The control device 61 can take this into account by regulating the heating power of each heating rod element 31, 32 and 33 of each heating rod 24a, 24b by adjusting the electrical energy supplied in each case in dependence on the temperatures measured by the respective temperature sensors 34.

In particular, the control device 61 can regulate the heating of the first heating rod elements 31 such that a substantially uniform temperature of about 100-200° C., in particular about 150° C. on average, is set in a first zone or region 67 at the level of the first heating rod elements 31, which allows the biomass 64 fed to be dried and dehumidified. The drying and dehumidification of the fed biomass 64 is also facilitated by the rising gases that rise from below through the interior 16 to the gas dome 21.

The second heating rod elements 32 and the third heating rod elements 33 are preferably electrically controlled to a significantly higher temperature in order to achieve the high temperatures required for pyrolysis. For example, the second heating rod elements 32 can be heated to a temperature of up to 500° C. or even 600° C. and the third heating rod elements 333 can be heated to a temperature of up to 900° C. or even 1000° C. In combination with the temperature of the first heating rod elements 31, a temperature gradient is thus generated which defines a second temperature zone or region 68 with a temperature of about 200-600° C., in particular about 300-500° C. on average, at the level of the second heating rod elements 32. Below this, a third zone or region 69 is present at the level of the third heating rod elements 33, which can have a temperature of about 500-900° C., in particular about 700-800° C. on average.

In the area below the third heating rod elements 33, a fourth zone or region 71 is created with a temperature suitable for cooling for discharge. The temperature in this cooling zone 71, in particular in the vicinity of the discharge lock 51, can be about 100-200° C., in particular about 150° C. on average.

In this way, the supplied biomass is continuously and gradually or steadily slowly, uniformly, increasingly warmed and heated through as it passes through the reactor interior 16 without being locally overheated. After the biomass 64 has been gently dried and dehumidified in the first zone 67, it is degassed and increasingly pyrolytically converted in the middle, second zone 68. In the lower, third zone 69, complete carbonization of the biomass 64 to biochar 66 is completed at the highest temperature. In the cooling zone 71, the biochar 66 is then cooled to a temperature suitable for removal.

The production of the biochar takes place in a continuous process, in which a defined quantity of biochar 66 is continuously removed per cycle or time interval and a corresponding defined quantity of biomass 64 is refilled into the reactor 2. This is in contrast to discontinuous processes, in which the entire reactor is filled and only emptied again after all the biomass has been converted to biochar. The continuous process is more efficient and more economical. It is monitored and coordinated by the control device 61. In particular, the control device 61 is arranged to control the holding time of the treated biomass 64 in the reactor interior 16 in combination with the regulation of the heating temperature of the heating rods 24 in dependence on the temperatures measured in a distributed manner in the reactor interior 16, as detected by the plurality of temperature sensors 34, by a specifically adapted actuation of the feed lock 43 and the discharge lock 51, preferably in a completely automated manner. In order to control the holding time of the biomass 64 in the reactor interior 16, the control device 61 can also use the measured negative pressure in the gas dome 21, the temperature of the pyrolysis gas when it is discharged through the discharge device 22 or during the subsequent combustion, or other measurable parameters which can indirectly provide information about the process conditions, the progress and the degree of treatment of the biomass 64 or the quality of the biochar.

If the control device 61 detects, for example, a sudden drop in temperature in the first, uppermost zone 67 based on the temperature sensor readings, this may indicate that the refilled biomass 64 is colder or more humid than the biomass supplied earlier. In response, the control device 61 may preferably automatically increase the supply of electrical power to at least the first heating rod elements 31 of the heating rods 24 to account for the greater coldness or moisture of the refilled biomass 64 by increasing the temperature in the first zone 67 so that the biomass 64 is more strongly dried or dehumidified. The control device 61 may also increase the cycle or interval time of actuation of the feed and discharge locks 43, 51 to enable the colder or wetter biomass 64 to be treated longer in the reactor interior 16. This ensures that the final biochar products 66 produced are of uniform good quality regardless of what type of biomass is fed at whatever moisture level and temperature.

The control device 61 takes the measured values of the temperature sensors 34 in the various zones 67, 68, 69 and 71 into account in order to achieve an optimal pyrolytic conversion of the biomass in accordance with a predetermined control logic. Any local deviation of the temperature from set values can be detected by the control device 61 and readjusted by readjusting the heating power of each individual heating rod element 31, 32 or 33 of each individual heating rod 24. The measured values of the temperature sensors 34, which are arranged as extensions at the lower ends 36 of the heating rods 24 in the cooling zone 71, are also regarded as important indicators of whether the resulting biochar 66 has been sufficiently treated. If the measured temperature in the cooling zone 71 is too low, this may indicate that the biomass 64 has been insufficiently carbonized as it passes through the reactor interior 16, whereupon the control device 61 may respond by adjusting the cycle time and/or the temperatures of the heating rods 24 or heating rod elements 31-33.

By providing the inner heating rods 24b in combination with the outer heating rods 24a, a uniform temperature in the transverse direction through the reactor interior 16 can be ensured in each zone 67-69. In addition, the risk of funneling, which can occasionally occur in vertically mounted moving bed reactors of conventional design due to rapid fall-through of the biomass, can be reduced, or any funneling that does occur can be quickly counteracted. If local funneling occurs due to the nature of the biomass 64, as indicated, for example, by 72 in FIG. 5, the control device 61 can determine this based on the received temperature readings and identify the affected area or sector between the corresponding outer and inner heating rods 24a, 24b. The control device 61 can then readjust the heating power of the associated heating rod elements 31-33 of the respective heating rods 24a, 24b in the identified area in order to intensify the treatment of the biomass 64 in this area. If necessary, the control device 61 can also additionally extend the holding time of the biomass 64 by increasing the cycle time.

The pyrolysis gas 73 produced during the production of the biochar 66 rises upwards in the reactor interior 16 and is filtered and increasingly cooled by the replenished biomass 64. Ash, if any, is also filtered out by the replenished biomass 64, which acts as a kind of biofilter. The pyrolysis gases 73 that reach the gas dome 21 are essentially free of ash and are discharged to the outside via the discharge device 22. Due to the negative pressure generated in the gas dome 21, any air flowing into the gas dome 21 is also extracted directly to the outside. The pyrolysis gases 73 can be substantially freely combusted or preferably also used to generate energy, for example in a gas turbine or a combined heat and power plant. The electrical energy can be used to heat the heating elements 24, stored or fed into a grid. This can further increase the energy balance of the apparatus 1.

The apparatus 1 can be used to obtain biochar of high quality, with a high degree of carbonisation, high carbon content of at least 90% by weight, preferably above 95% by weight, low polycyclic aromatic hydrocarbon (PAH) content of less than 4 mg/kg, preferably less than 2 mg/kg, low ash content, a high degree of porosity, a large specific surface area and great stability. The steady, gentle treatment prevents the biomass 64 or biochar 66 from bursting, which could result in disintegration into dust and associated combustion or explosion. The resulting biochar 66 is ideally suited for use in agriculture as a soil conditioner, a carrier for fertilizers and habitat for microorganisms, an adjuvant for composting and nutrient fixation of manure, a feed additive and nutritional supplement, and also as a product for other industries. If the biochar is incorporated into agricultural soils, it can bind carbon stably for a long time, for over 1000 years, and remove the carbon dioxide originally assimilated by plants from the atmosphere for a long period of time. Thus, the biochar can contribute to the reduction of global warming.

Numerous modifications are possible within the scope of the invention. For example, the reactor 2 may have any shape, e.g., prismatic, particularly cuboidal. The outer heating rods 24a and the inner heating rods 24b may then be positioned, for example, but not necessarily in corresponding square, rectangular or other polygonal ring arrangements 25a, 25b, which may correspond to the shape of the reactor. Any number of outer and inner heating rods 24a, 24b may be used, and also a different number of heating rod elements 31, 33 per heating rod 24, for example more than three heating rod elements per heating rod 24. It is possible to provide three or more concentric ring arrangements of heating rods 24 to heat the reactor interior 16 uniformly in the transverse direction and with the desired temperature profile in the longitudinal direction. The length of the heating rod elements 31-33 or heating rods 24 may also be different in different areas of the reactor interior 16. Thermal insulation 17 could also be provided in the area of the cooling zone 71 to prevent heat leakage there as well. Instead of the feed lock 43 and the discharge lock 51, simple closure plates, flaps or the like could also be provided, but the locks 43, 51 allow almost absolute tightness and prevention of an intake of atmospheric oxygen. This is extremely important for the pyrolysis process and the final biochar product. The feed of biomass 64 and the discharge of the biochar 66 could also be provided through the reactor shell 12 instead of through the upper cover 13 and the lower bottom 14. It is also possible to combine several such devices 1 with two or more reactors 2 to form a larger biochar production system.

Figure 6:
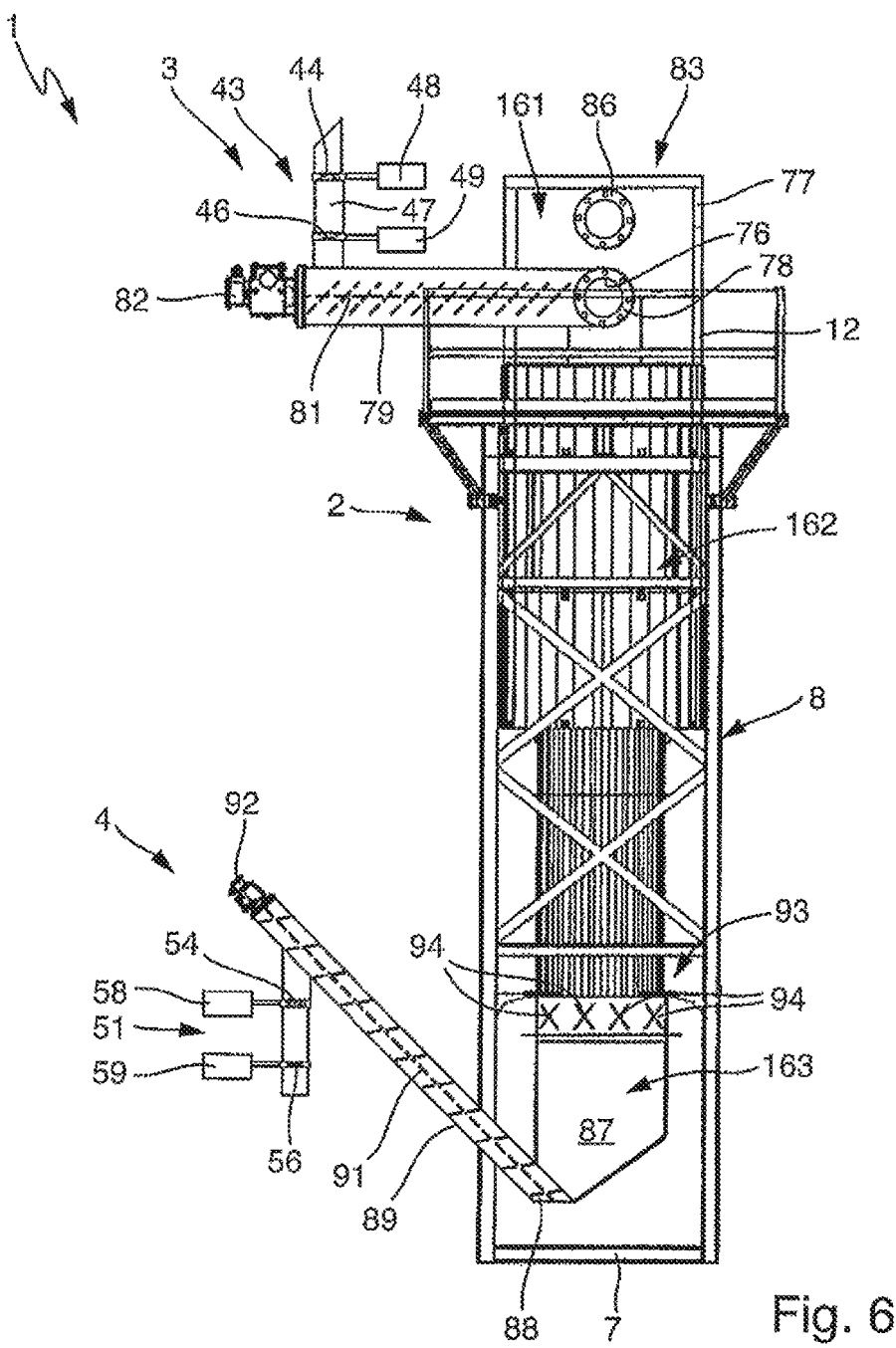
FIG. 6 is a schematic view of an apparatus for the production of biochar by pyrolysis according to a further preferred embodiment of the invention.
Figure 7:
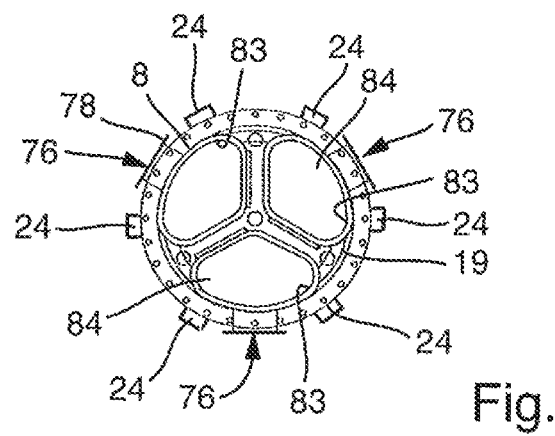
FIG. 7 is a top view of the apparatus according to FIG. 6, in a simplified representation.
Figure 8:
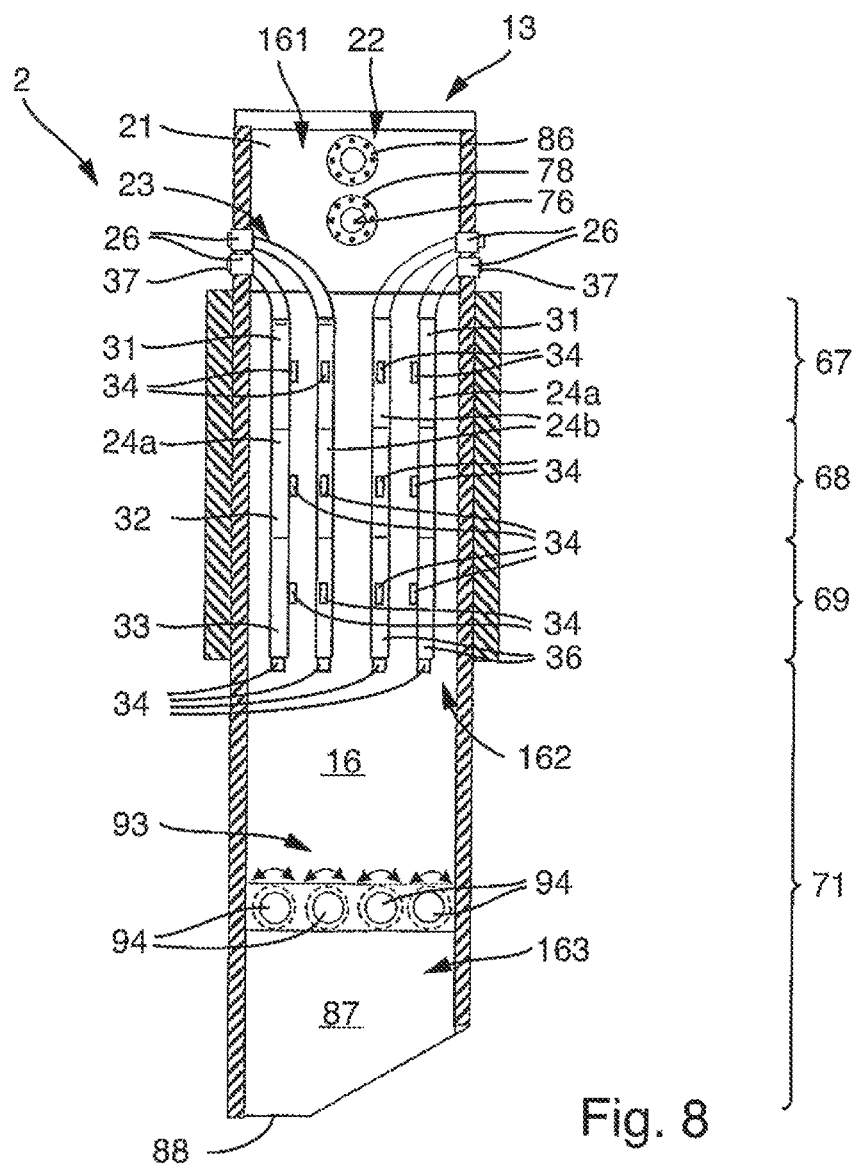
FIG. 8 is a side view, partially shown in longitudinal section, of the apparatus according to FIG. 1, in a simplified representation.

FIGS. 6-8 show advantageous further embodiments of an apparatus 1 according to the invention for the production of biochar by pyrolysis of biomass according to a further particularly preferred embodiment. FIG. 6 shows a simplified side view of the apparatus 1, while FIG. 7 shows a top view thereof and FIG. 8 shows a simplified, sectional longitudinal view through the apparatus 1. Insofar as the apparatus 1 according to FIGS. 6-8 is identical or substantially identical with the apparatus 1 described above according to FIGS. 1-5 with regard to the construction and/or the mode of operation, in order to avoid repetition reference is made to the above description, using the same reference signs. Unless differences are mentioned below with respect to the construction and/or the mode of operation, the above explanations in connection with the embodiment according to FIGS. 1-5 apply in the same way to the embodiment according to FIGS. 6-8.

The particularly preferred embodiment of the apparatus 1 according to the invention as shown in FIGS. 6-8 differs from that shown in FIGS. 1-5 especially in the way the biomass 64 is fed into the reactor 2 and the finished biochar 66 is removed therefrom. More specifically, the biomass is not fed through an access opening 38 in the upper cover plate of the reactor 2, but from the side of the reactor 2. For this purpose, the reactor 2 has, in its upper head end region, at least one access opening 76 formed in a side wall 77 in the feed region 161 of the reactor 2, through which the biomass 64 to be treated can be fed. Preferably, as can be seen in particular from FIG. 7, a plurality of access openings 76, for example three or four, are uniformly distributed around the periphery of the reactor wall 77 in order to introduce the biomass into the reactor interior 16 substantially uniformly from all directions in the transverse plane.

Each access opening 76 is provided with a flange 78 to which a feed tube 79 is connected with a feed screw 81 arranged therein. The feed screw 81 is drivable by a motor 82 to convey fed biomaterial to the access opening 76. The feed screw 81 can be identical or similar to the filling screw 41.

At the end of the feed tube 79 remote from the reactor 2, a feed lock 43 is arranged to introduce a metered amount of biomass supplied via a conveying device, which is not shown in more detail herein, into the feed tube 79 under exclusion of air. The biomass is then fed to the interior 16 through the feed tube 79 by means of the feed screw 81. The feed lock 43 may be of the same design and mode of operation as the feed lock 43 of the apparatus 1 according to the embodiments of FIGS. 1-5, so that the foregoing explanations in this regard apply here in the same manner. Suffice it to say that the feed lock 43 has preferably pneumatically or electrically or hydraulically operable sliders 44, 46 which delimit a lock space 47 and with which drive devices 48, 49 are associated in order to alternately operate or adjust the sliders 44, 46 in a controlled manner so that they open alternately, offset in time from each other. As a result, when the biomass is fed in, an air inflow to the reactor interior 16 via the feed device 3 can be avoided or at least reduced to a minimum.

It should be mentioned that further conveying means provided to transport the biomaterial from a storage container to the feed lock 43 are omitted in FIG. 6 for simplicity and clarity. In FIGS. 7 and 8, the feed tubes 79, the feed screws 81 and the motors 82 are also omitted for clarity.

As further shown in FIG. 7, a plurality of, here three, inspection openings 83 can preferably be provided on the upper cover 13 of the feed region 161 of the reactor 2, which allow access to the reactor interior 16 for inspection, maintenance or refitting purposes, if required. The inspection openings 83 can be closed by suitable closing means, e.g. pivotable closing flaps 84, which can be pivoted into the open position, for example, to expose the inspection openings 83. It is recognized that different numbers and designs of the inspection openings and associated closing means are possible herein. After the feed device 3 has been moved to the side of the reactor 2, space is advantageously created for access to the reactor interior 16 at the upper front end of the reactor 2.

Referring in particular to FIGS. 6 and 8, it can be seen that, in contrast to the embodiment according to FIGS. 1-5, the discharge device 22 for the resulting pyrolysis gas is located here above the access opening or access openings 76 for the biomass. In particular, a gas line flange 86 for attaching a gas line for discharging the pyrolysis gas 73 is provided at the upper end of the feed region 161 of the reactor 2 above the access opening 76 for biomass arranged in the side wall 77. The same number of gas line flanges 86 as flanges 78 with access openings 76 may be provided. Due to the higher arrangement of the flanges 78, 86, the supplied biomass does not pass the area of the gas line flanges 86 on its downward migration path, so that a negative pressure generated by the gas discharge advantageously does not influence, deflect or swirl the supplied biomass.

The removal device 4 of the apparatus 1 according to FIGS. 6-8 also differs from the removal device 4 of the embodiment according to FIGS. 1-5. As can be seen in particular from FIG. 6, the reactor 2 has at its lower end in the removal region 163 a collecting space 87, which progressively tapers toward the lower end 88 to allow the produced biochar 66 to travel to the narrowed lower end 88 of the discharge region 163. Connected to the lower end 88 of the removal region 163 is a discharge tube 89, in which a discharge screw 91 is arranged which is configured to convey the biochar 66 outwardly from the removal region 163 through the discharge tube 89. The discharge screw 91 is driven by a motor 92. The motor 92 of the discharge screw 91 and the motor 82 of the feed screw 81 are suitably controlled by the control device 61 to accomplish the removal process and the feeding process under exclusion of air. The control device 61 is substantially the same as the control device 61 of the embodiment according to FIGS. 1-5 and is omitted here for clarity.

At the end of the discharge tube 89 remote from the reactor 2, a discharge lock 51 is provided which is substantially the same and functions in the same manner as the discharge lock 51 of the embodiment shown in FIGS. 1-5. To avoid repetition, reference is made to the foregoing description in this regard. Suffice it to mention that the discharge lock has the sliders 54, 56 which define the lock space 57 therebetween and are each alternately actuated, in particular displaced or pivoted, in a controlled manner by a preferably pneumatic, optionally electric or hydraulic drive device 58, 59, so that they open alternately, offset in time from each other. As a result, the air intake through the discharge lock 51 can be avoided or at least reduced to a minimum.

As can further be seen from FIGS. 6 and 8, a controllable distribution device 93 for distributing the biochar 66 in the transverse direction of the reactor 2, i.e. over the width of the reactor interior 16, is provided here at the transition between the process chamber 162 and the removal region 163, or at least in the vicinity of the latter. Here, the distributing device 93 has a suitable number of, for example, four individually controllable and motor-movable distribution means 94, which are merely indicated in FIG. 6, and which make it possible to deflect the biochar selectively towards a side wall of the removal region 163 or towards the center of the removal region. In particular, the distribution means 94 can be formed by distribution augers each of which can be individually rotated selectively in any direction of rotation by a motor, which is not shown in greater detail herein. Thus, the biochar can be distributed forward or backward (into or out of the sheet plane in FIG. 6) and optionally to the left or to the right, as required.

It is understood that the drive means for the distribution augers 94 are also communicatively connected to the control device 61, which controls the rotation of the distribution augers 94 as required to affect the passage of the biochar to the underlying portion of the removal region 163 and the distribution of the biochar in the transverse direction.

As a further difference to the embodiment according to FIGS. 1-5, in the apparatus 1 according to FIGS. 6-8 the heating device 23 is not attached to the upper cover, but to the side wall 77 of the feed region 161 of the reactor 2. Again, the heating device 23 has a plurality of heating rods 24 here, which are heated by means of electrical energy, the heating rods 24 including a plurality of outer heating rods 24a which are vertically arranged in the vicinity of the reactor shell 12 and distributed around the circumference of the reactor, and at least one inner heating rod 24b which is vertically arranged closer to the center of the reactor interior 16 with respect to the reactor shell 12. Preferably, at least four, more preferably at least six or eight outer heating rods 24a are also arranged here at uniform circumferential intervals from each other, e.g. on an outer circle or ring 25a in the vicinity of the reactor shell 12, and at least two, more preferably at least three or four inner heating rods 24b are arranged at uniform circumferential intervals from each other, e.g. on an inner circle or ring 25b closer to the center of the reactor, as described above in connection with FIGS. 2 and 3. Each heating rod 24 preferably has at least two, more preferably three or more elongated heating rod elements 31, 32, 33 which are arranged one behind the other in the longitudinal direction of the reactor 2 and are individually adjustable in their heating power. In addition, the heating rods 24, preferably each of the heating rod elements 31, 32, 33 are assigned temperature sensors 34 for measuring the temperatures at respective locations distributed in the reactor interior 16, the temperature sensors 34 preferably being arranged on the heating rods 24, for example approximately in the center of a respective heating rod element 31, 32, 33, and preferably also at the lower end 36 of the heating rods 24 in the vicinity of the cooling zone 71.

All heating rods 24 are fastened here to the side wall 77 at the upper end of the reactor 2 by means of the mounting devices 26. For this purpose, receiving openings for the upper ends 37 of the heating rods 24, which are not specified herein, are provided in the side wall 77. The heating rods 24 are all curved at their upper end portions 96, bent to the side, so that the heating rods 24, starting from the upper ends 37 received in the mounting devices 26 on the side wall 77, extend over the bent or curved section 96 first both radially inwards and downwards in the longitudinal direction of the reactor 2 and merge into portions of the heating rods 24, which all run parallel to one another and to the shell wall 12 of the reactor 2 downwards in the longitudinal direction. The heating rods 24 are preferably secured only in the mounting means 26 and otherwise project in a freely suspended manner into the reactor interior 16. Additional mounting means for the heating rods 24a, 24b inside the reactor 2 are not required, so that the flow of biomass is not impeded.

In operation, the apparatus 1 for continuous production of biochar by pyrolysis of biomass under exclusion of oxygen of the embodiment according to FIGS. 6-8 functions substantially the same as the apparatus 1 according to FIGS. 1-5. Here, the only difference is that the biomass 64 is fed via the feed device 3 with the feed lock 43 through the feed tube 79 with the feed screw 81 and via the access openings 76 in the side wall 77 from the side into the feed region 161 of the reactor 2. Feeding the biomass 64 from the side is gentler because the biomass is less agitated as it enters the feed region 161. The arrangement of the discharge device 22 for the pyrolysis gas 73 above the access openings 76 is also favorable because turbulence of the fed biomass, which could otherwise be caused when passing through the discharge device 22 as a result of the suction of the pyrolysis gas, can be avoided.

In all other respects, the feeding of the biomass 64 to the feed region 161, the actuation of the feed lock, in particular the sliders 44, 46, and the generation of the negative pressure in the feed region 161 by extraction of the pyrolysis gas 73 are suitably controlled by the control device 61.

The biomass 64 then migrates downward in the longitudinal direction of the reactor 2 by gravity, advantageously with the end portions 96 of the heating rods 24 bent to the side providing little obstruction to the flow of material. The biomass 64 is then increasingly pyrolytically carbonized and converted to biochar in the process chamber 162 in a controlled manner by controlling the heating temperatures of the heating rods 24. The produced biochar 66 is discharged under exclusion of air by means of the removal device 4 via the discharge pipe 89 with the discharge screw 91 and the discharge lock 51 in a controlled manner by the control device 61.

Here, in contrast to the embodiment according to FIGS. 1-5, the control device 61 additionally controls the distribution augers 94 of the distribution device 93 to control the mass flow rate of the biochar as required. In particular, the control device 63 controls the distribution augers 94 suitably in order to allow the biochar 66 to pass from the overlying area of the cooling zone 71 to the lower collecting chamber 87 of the reactor 2 from which the biochar 66 is then removed.

If the control device 61 determines, based on the readings provided by the temperature sensors 34, that the biomass 64 or the biochar 66 is not at the desired target temperature in any region of the reactor 2, which may be an indication of incipient funneling, the control device may individually control the distribution augers 94 to distribute the biochar 66 across the width of the reactor interior 16, i.e., in the transverse direction, perpendicular to the longitudinal or depth direction, as needed to counteract the funneling.

For example, looking at FIG. 6 or 8, if funneling is detected in the immediate vicinity of the reactor shell 12 on the right side, the control device 61 may make all distributor screws 94 to rotate in the same direction, e.g. clockwise, so that the biochar is shifted towards the right side of the reactor 2 in FIG. 8 and the incipient funneling is counteracted quickly and effectively. All of the distribution augers 94 could also be rotated in a counterclockwise direction. Depending on the direction of rotation, the biochar 66 can additionally be displaced perpendicular to the transverse direction considered in FIG. 8, i.e. to the rear or to the front (into or out of the sheet plane in FIG. 8).

For example, if funneling occurs at approximately the center of the reactor interior 16, the control device 61 may drive the two distribution augers 94 on the left in FIG. 8 in a clockwise direction and the two distribution augers 94 on the right in a counterclockwise direction to deflect the biochar toward the center of the reactor 2. Under other conditions, the control device 61 may drive different individual distribution augers 94 in one sense of rotation and the others in the reverse sense of rotation to cause a desired distribution of the biochar. In this way, the degree of treatment of the biomass 94 in the overlying region of the process chamber 162 can be suitably affected, in particular its holding time can be extended. The individual controllability of the distribution augers 94 of the distribution device 93 results in additional flexibility in controlling the holding time of the treated biomass 64 in the reactor interior 16, which is otherwise completely automated in combination with the control of the heating temperature of the heating rods 24 in dependence on the measured temperatures in the reactor interior 12 by a specifically adapted actuation of the feed lock 43, the feed screw 81, the discharge screw 91 and the discharge lock 51.

Moreover, further embodiments mentioned herein in connection with the embodiment according to FIGS. 6-8 may also be applied individually or all, if applicable, to the embodiment according to FIGS. 1-5 and vice versa.

An apparatus 1 for the continuous production of biochar by pyrolysis of biomass under exclusion of oxygen is provided. The apparatus 1 comprises a vertically mounted reactor 2 having a reactor interior 16 which is defined by a reactor shell 12 and which has an upper feed region 161, a lower removal region 163 and a process space 162 located therebetween, a feed device 3 for feeding biomass to the upper feed region 161, a removal device 4 for removing biochar from the lower removal region 163, and a heating device 23 positioned in the reactor interior 16. The heating device 23 comprises a plurality of outer heating rods 24a vertically arranged in the vicinity of the reactor shell 12 and distributed around the circumference of the reactor 2, and at least one inner heating rod 24b vertically arranged in or in the vicinity of the center 27 of the reactor interior 16. A control device 61 is provided for controlling the operation of the apparatus 1. The control device 61 controls the actuation of the feed device 3 and the removal device 4 and regulates the temperature of the heating rods 24a, 24b in dependence on temperatures measured at distributed locations in the reactor interior 16 in order to adjust the holding time and pyrolytic conversion of the biomass in dependence on the respective operating conditions, ambient conditions and the particular biomass used.

The invention claimed is:

1. An apparatus for continuous production of biochar by pyrolysis of biomass under exclusion of oxygen, the apparatus comprising:
   a vertically mounted reactor having a reactor interior which is defined by a reactor shell and which has an upper feed region, a lower removal region and a process space located therebetween;
   a feed device for feeding biomass to the reactor interior into the upper feed region;
   a removal device for removing biochar from the reactor interior from the lower removal region;
   a heating device positioned in the reactor interior, the heating device comprising an array of heating rods including:

a plurality of outer heating rods vertically arranged in the reactor shell and distributed around a circumference of the reactor, and at least one inner heating rod is vertically arranged closer to a center of the reactor interior with respect to the reactor shell than the plurality of outer heating rods; and a control device for controlling operation of the apparatus, including actuation of the feed device and the removal device, and for controlling a temperature of individual heating rod elements of the plurality of outer heating rods and the at least one inner heating rod, wherein the individual heating rod elements of each of the plurality of outer heating rods and the at least one inner heating rod comprises two or more, elongated heating rod elements which are arranged one behind another in a longitudinal direction of the reactor and are individually controllable in their heating power.

2. The apparatus according to claim 1, wherein each heating rod of the array of heating rods is heatable by means of electrical energy and the control device is arranged to individually control/regulate a heating power of each heating rod of the array of heating rods.

3. The apparatus according to claim 1, wherein at least four of the plurality of outer heating rods are provided at uniform circumferential intervals from each other and the at least one inner heating rod is two inner heating rods provided at uniform circumferential intervals from each other.

4. The apparatus according to claim 1, wherein a number of the plurality of outer heating rods is at least twice a number of the at least one inner heating rod is circumferentially offset from the plurality of outer heating rods.

5. The apparatus according to claim 1, wherein the array of heating rods are attached by mounting means to an upper cover of the reactor interior or to one or more side walls in the upper feed region of the reactor and project into the reactor interior in a freely suspended manner.

6. The apparatus according to claim 1, wherein upper end portions of the at least one inner heating rod or inner heating rods are bent radially outwardly to a side.

7. The apparatus according to claim 1, wherein the apparatus further comprises a plurality of temperature sensors for measuring temperatures at distributed locations in the reactor interior.

8. The apparatus according to claim 7, wherein at least one of the plurality of temperature sensors is assigned to each of the plurality of outer heating rods and the at least one inner heating rod for measuring a temperature proximate to each of the plurality of outer heating rods and the at least one inner heating rod.

9. The apparatus according to claim 7, wherein the plurality of temperature sensors are arranged below the plurality of outer heating rods and the at least one inner heating rod to measure a temperature of produced biochar prior to its removal.

10. The apparatus according to claim 1, wherein the control device is arranged to regulate heating power of the elongated heating rod elements during operation in such a way that a progressively higher temperature of the reactor interior is set in a downward depth direction and a lower cooling temperature is set at the removal device due to an absence of elongated heating rod elements in a bottom of the reactor.

11. The apparatus according to claim 1, wherein the feed device comprises a feed lock and the removal device comprises a discharge lock, wherein the control device is arranged to actuate the feed lock and the discharge lock such that they are opened alternately, offset in time from each other.

12. The apparatus according to claim 11, wherein the feed lock and the discharge lock each comprise a first and a second adjustable slider which are arranged at a distance from each other in a height direction and define a lockable lock space therebetween, wherein the control device is arranged to actuate the first and second adjustable sliders in such a way that they are opened alternately, offset in time from each other.

13. The apparatus according to claim 1, wherein the control device comprises a control logic to control a holding time of a treated biomass in the reactor interior as a function of a regulated heating temperature of the array of heating rods in dependence on temperatures measured in a distributed manner in the reactor interior and the actuation of the feed device and the removal device.

14. The apparatus according to claim 1, wherein a discharge device for pyrolysis gas is provided in the upper feed region, the discharge device being arranged for discharging pyrolysis gas generated during operation from the reactor interior while generating negative pressure in the upper feed region.

15. The apparatus according to claim 1, wherein a controllable distribution device for distributing the biochar over a width of the reactor interior is provided in the removal region or adjacent to the removal region, wherein the distribution device comprises two or more individually controllable and motor-driven movable distribution means.

16. The apparatus according to claim 15, wherein the motor-driven movable distribution means it are distribution augers.

17. The apparatus according to claim 3, wherein the plurality of outer heating rods is six or eight that are provided at uniform circumferential intervals from each other and at least three inner heating rods inner heating rods or at least four inner heating rods are provided at uniform circumferential intervals from each other.

18. The apparatus according to claim 1, wherein each heating rod of the plurality of outer heating rods and the at least one inner heating rod comprises three or more elongated heating rod elements which are arranged one behind another in the longitudinal direction of the reactor and are individually controllable in their heating power.

19. The apparatus according to claim 2, wherein the plurality of outer heating rods comprise at least four outer heating rods that are provided at uniform circumferential intervals from each other and the at least one inner heating rod is two inner heating rods provided at uniform circumferential intervals from each other.

* * * * *